United States Patent [19]
Reighter

[11] Patent Number: 4,787,677
[45] Date of Patent: Nov. 29, 1988

[54] INFANT VEHICLE SAFETY RESTRAINT

[75] Inventor: Gregory A. Reighter, Panama City, Fla.

[73] Assignee: Secure Concepts, Inc., Englewood, Colo.

[21] Appl. No.: 59,299

[22] Filed: Jun. 8, 1987

[51] Int. Cl.4 .................. A47C 31/00; B60R 22/10
[52] U.S. Cl. ...................... 297/464; 24/200; 224/159; 297/465
[58] Field of Search ............ 297/464, 465, 468, 483; 24/169, 198, 200; 224/158, 159, 160; 280/290, 801, 808

[56] References Cited

U.S. PATENT DOCUMENTS 3,480,325  11/1969  Kramer ........................... 297/485
4,234,229  11/1980  Arnold ............................ 297/467

FOREIGN PATENT DOCUMENTS 151034   10/1937  Austria ............................ 24/200
147815   4/1981   German Democratic Rep. .......................... 297/465
505530   5/1939   United Kingdom ............. 24/200

Primary Examiner—Peter A. Aschenbrenner
Assistant Examiner—Peter R. Brown
Attorney, Agent, or Firm—Lee G. Meyer

[57] ABSTRACT

A compliance, compact, collapsible, lightweight infant or child restraint device is provided which is detachably secured directly to an unaltered lap belt which can contain a shoulder harness in a vehicle such that the restrained infant is positioned in a face-to-face relationship with the attending adult yet the restrained infant is not attached in any manner to or dependent for security upon the attending adult. The infant restraining device secures the infant against the body of the attending adult in a "lap-down, face-up" relationship such that the needs of the infant are able to be attended to without the attending adult removing his/her seatbelt or having to "turn around" in relation to the infant to be attended.

12 Claims, 2 Drawing Sheets

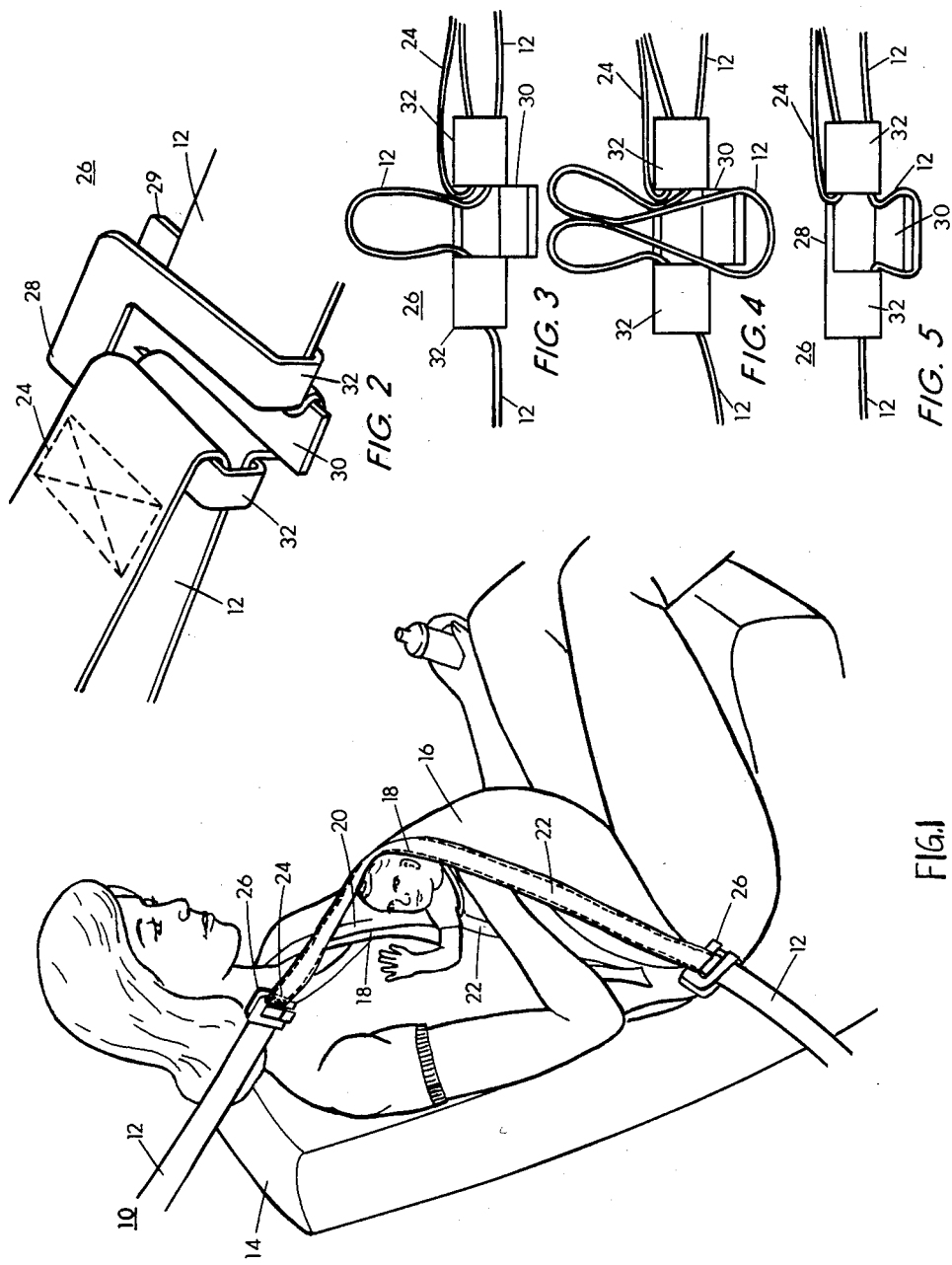

INFANT VEHICLE SAFETY RESTRAINT

FIELD OF INVENTION

This invention relates generally to safety devices for restraining an infant, pet, or the like in a moving vehicle and more particularly to an infant, safety restraining device which is detachably secured to a standard seat belt while maintaining the restrained infant in a face-to-face, proximate relationship with an adult attending passenger.

BACKGROUND

Restraint of passengers in moving vehicles such as planes, cars and trucks has drawn national attention. This is particularly true of children of tender years and infants. Many states, as part of their safety laws regarding motor vehicle, have actually adopted laws which require children below a certain age to be physically restrained by approved devices while riding in a moving vehicle. This requirement prevents children and especially infants from being maimed or killed by being tossed about on the inside of the vehicle or thrown outside the vehicle in an accident. The FAA and other agencies associated with air travel have like restraint requirements.

While a great deal of attention has been focused on the "car seat" as a safety restraint for children who are passengers in automobiles, such devices are not totally adequate for infants or very small children. In order to utilize such a device in an airplane, the purchase of an additional fare/seat is required.

The "traditional" car seat is generally a stand alone unit which restrains the child in either a forward looking or rearward looking position. Most of these devices will not accommodate an infant. The device restrains the occupant out of immediate proximity of an adult passenger. When, for example, in the traditional mounting, the car seat is placed on the rear seat of an automobile, attending the restrained child may require the attending adult to turn around from an adjacent seat or actually unbuckle his/her seat belt to lean over the back seat to attend the restrained child.

In many cases, the traditional, stand-alone car seat must be attached to the frame of the vehicle by law. It therefore either requires a permanent independent mounting which affects the permanent occupancy of a passenger seating space, or the restraint is fastened to the vehicle using the vehicle's existing seat (lap and/or shoulder) belt device. Unless the restraining device is removed, the car seat type restraint occupies a space in the vehicle preventing its use by another passenger, even when the restraint is not occupied by a child. To remove the device is often awkward and cumbersome.

In the absence of a seat-type restraint that is carried onto the airplane, no provision is made for the infant child in an aircraft other than to have an adult passenger hold the child in his/her lap. In the event of a sudden stop or rough landing, the safety of the child is solely dependent on the ability of the adult to secure the infant. Studies show that this arrangement is extremely dangerous in both air and ground vehicle travel. Many states, therefore, prohibit the holding of an infant by a restrained adult at least in automobiles. Further, studies have shown that placing an adult lap or shoulder belt around both the child being held in the lap and the adult is almost always fatal to the child in a sudden stop or an accident, in that the weight of the adult passenger crushes the child between the belt and the passenger.

The prior art is replete with devices intended to secure or restrain an infant or child of tender years. Conventional child restraint systems have heretofore been bulky and relatively expensive. Among these prior art devices are some which present a supplementary harness to be used in conjunction with a seat belt. In many cases, the child may be restrained while standing. With these devices, the child is harnessed independently of any adult passenger and is so oriented relative to the vehicle so that he or she faces forwardly in the direction of normal movement. These devices involve fairly intricate adjustments to provide for a particular child and in many cases do not accommodate an infant at all. Additionally, most of these devices do not comply with state law. In yet other restraints, the infant is secured to the body of the attending passenger.

For example, U.S. Pat. No. 4,234,229, issued Nov. 18, 1980 to Arnold, involves an intricate papoose device wherein the infant is strapped and harnessed into a restraint which then is strapped to the body of the adult wearer. The straps which encompass the adult wearer are then secured or attached to a standard seat belt. Such devices rely primarily upon the attachment to the adult wearer for restraint and are difficult to remove from the adult as well as the lap belt. Likewise, U.S. Pat. No. 2,376,657, issued Dec. 4, 1943 to Chamberlain, discloses an infant carrier comprising a satchel type device that is attached to the body of the wearer so that it can be slung over the shoulder of a person such that the baby is carried in the satchel substantially on the hip of the wearer. Such a device provides substantially no protection for the infant in a moving vehicle. The Lancaster patent, U.S. Pat. No. 278,437 issued in 1883, shows an over the shoulder type harness with an eyelet and a clip to attach a sling or a pouch in which the infant is placed. In this device, however, the harness is secured totally to the adult and requires intricate clasps to fasten and unfasten the carrier. This provides substantially no protection for the infant and little restraint in a moving vehicle.

There are a number of drawbacks to these prior art devices in that, for the most part, the only direct connection of the infant harness is to the body of the adult. Even when there is a securing means for fastening the device to a seat belt or the like, such means involve loops or sewn-in clasps which do not allow for ease of detachability and do not, in fact, comprise a restraint per se, which is fastened to the vehicle totally independent of the body of the attending adult passenger. Further, with devices that slip over the seat buckle, the device is not frictionally secured to the seat belt so as to prevent the fastener from moving along the belt and allowing the device to move.

Accordingly, it would be advantageous to have an infant restraint detachably secured directly to and frictionally engaging an unaltered lap and/or shoulder belt in a vehicle such that the infant is totally secure and completely restrained within the device without being attached in any manner to, or dependent for security on, the attending adult. Further, it would be advantageous for the infant restraining device to be able to hold the infant securely against the body of the adult in a face-to-face relationship where infants are most naturally comfortable and secure as well as where the infant can be most easily attended. It would likewise be advantageous if the needs of the infant could be attended without the attending adult removing his/her seatbelt and having to turn around in relation to the infant to be attended.

Further, it would be advantageous to have a restraint where the infant could be most easily attended by laying in a "lap down, face up" position in a face-to-face relationship proximate the attending adult without being strapped to the body of the adult.

Further, it would be advantageous to have a restraint which is in full compliance with applicable Federal Aviation Agency and other state agency regulations defining performance and safety standards for seat belts while still being compact, lightweight, easy to use, fully adjustable, rugged, reliable and versatile enough to accommodate the infant's needs but not occupying a seat in the vehicle when not in use.

SUMMARY OF THE INVENTION

According to the invention, a compliance, compact, collapsible, lightweight infant or child restraint device is provided which is detachably secured directly to an unaltered lap belt which can contain a shoulder harness in a vehicle such that the restrained infant is positioned in a face-to-face relationship with the attending adult yet the restrained infant is not attached in any manner to or dependent for security upon the attending adult. The infant restraining device of the instant invention secures the infant against the body of the attending adult in a "lap-down, face-up" relationship such that the needs of the infant are able to be attended to without the attending adult removing his/her seatbelt or having to "turn around" in relation to the infant to be attended. The restraint device of the instant invention can be in compliance with applicable Federal Aviation Agency and other state agency regulations defining performance and safety standards for child restraints while still being compact, lightweight, collapsible, easy to use, fully adjustable, rugged, reliable and versatile enough to accommodate the infant's needs but not occupying a seat in the vehicle when not in use.

In accordance with one aspect, the device comprises a pouch-forming panel fastened to at least two webbed belts, each of which are, in turn, attached to at least one frictionally engaging connector for detachably securing the device to a standard lap belt. In another aspect, the restraint device employs three frictionally engaging connectors for use with a standard vehicle lap belt having a shoulder harness. These aspects and others will become clear upon reference to the drawings.

BRIEF DESCRIPTION OF THE DRAWINGS

The invention will now be further described by way of examples with reference being had to the accompanying drawings in connection with a detailed description of the preferred embodiment.

FIG. 1 is a perspective view showing the infant occupying the restraint device, in a face-to-face relationship with the attending adult, with the restraining device attached by means of the detachable, frictionally engaging connector to the vehicle by means of a standard lap belt having a shoulder harness;

FIG. 2 is a top, sideways-looking, perspective view of the connector used to frictionally, detachably secure the restraint device to a standard seat belt;

FIGS. 3, 4, and 5 are sideways-looking, perspective views of the connector illustrating diagramatically how a standard webbed lap belt strap is threaded into and through the connector to frictionally and immovably engage the lap belt, thus securing the device;

DETAILED DESCRIPTION OF THE INVENTION

Figure 7:
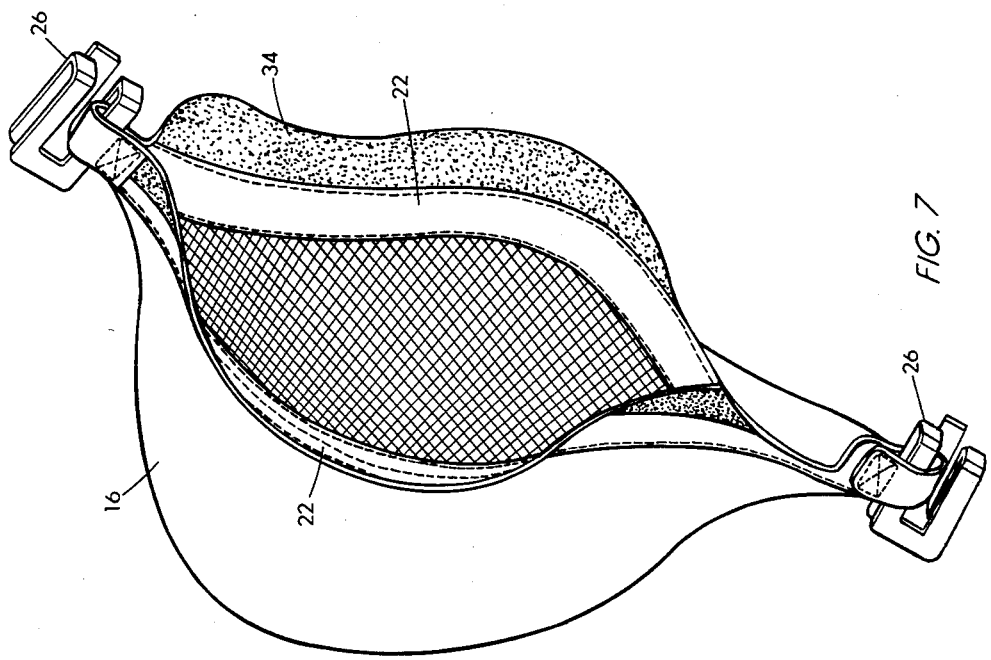
FIG. 7 is a rear view of the restraint device having two connectors for use with a standard lap belt which is not equipped with a shoulder harness.

Referring now to the drawings for a detailed description of the present invention, there is shown a reference numeral 10 which has been selected to broadly designate the vehicle safety restraint device in combination with a standard lap belt equipped with a shoulder belt and the vehicle seat in operating relationship with the attending adult. Specifically, numeral 12 designates a conventional webbed vehicle lap or seat belt having a shoulder harness portion of the type typically found in a standard motor vehicle and used to secure a person into a standard motor vehicle seat 14 in a manner substantially as shown in FIG. 1.

As seen in FIG. 1, the infant receiving and securing portion of the restraint device is an assembly comprising a pouch-forming, fabric panel member 16 securably attached at each of its opening edges to a supporting, belting member 22. The pouch-forming, panel member 16 is generally configured to accept an infant within the confines of the pouch such that the panel supports the head, backside, and rump of the occupant.

Panel member 16 forms two upper edges 18. The leading edge of supporting belting member 22 is disposed along the upper edge 18 of panel 16. The upper edges 18 are configured in operating relationship one to the other so as to form an opening 20 there between which is substantially horizontal. The opening 20 is adapted to receive an infant's body therein to secure the infant within the pouch-forming, panel member 16. In this manner, the infant can be placed through the opening so as to be cradled securely within the pouch-forming, panel member 16. The upper edges 18 of the panel 16 are formed along the top portion of the length of the woven support belting member 22. Support belting member 22 is diposed the length of the horizontal opening continuing past the opening and extending past the panel 16 to terminate at a connector 26. Thus, fixedly attached to each terminus of each woven support belting member 22 is a connector 26.

As shown in FIG. 2, connector 26 comprises a single piece of flattened, rigid material such as stainless steel, spring steel, or the like appropriately fashioned and angled to the appropriate shape such that the connector 26 comprises an upper and lower pair of approximately parallel strap engaging arms 28 and 29, respectively. The upper and lower pair of strap engaging arms 28 and 29 are maintained in a spaced apart, supported, parallel relationship by a pair of upward standing perpendicular connecting portions 32 which communicate with the strap engaging arms. A tongue portion 30 is disposed below the lower pair of flattened, parallel strap engaging arms 28 and substantially parallel therewith. Preferably, connector 26 is formed of a single sheet of material.

The support belting member 22 is looped around one portion of a pair of strap engaging arms 28 and fixedly attached to the upper side of the looped belting member 22 to form a fastening position 24 in the manner as shown in FIG. 2. The belting is preferably secured at fastening position 24 by stitching or the like to maintain a permanent, secure link between belting member 22 and connector 26.

In one embodiment, as better seen in FIG. 7, two connectors 26 are used to secure the restraint device to the lap belt 12. In this embodiment, the belting 22 is horizontally disposed along and fixedly attached to the upper edges 18 of panel 16. The belting extends first the length of the panel 16 and then joins at the termination of the opening to form a single unit. The support belting member 22, thus joined, further extends in both directions to engage a connector 26 at either end of the belting member 22.

Figure 6:
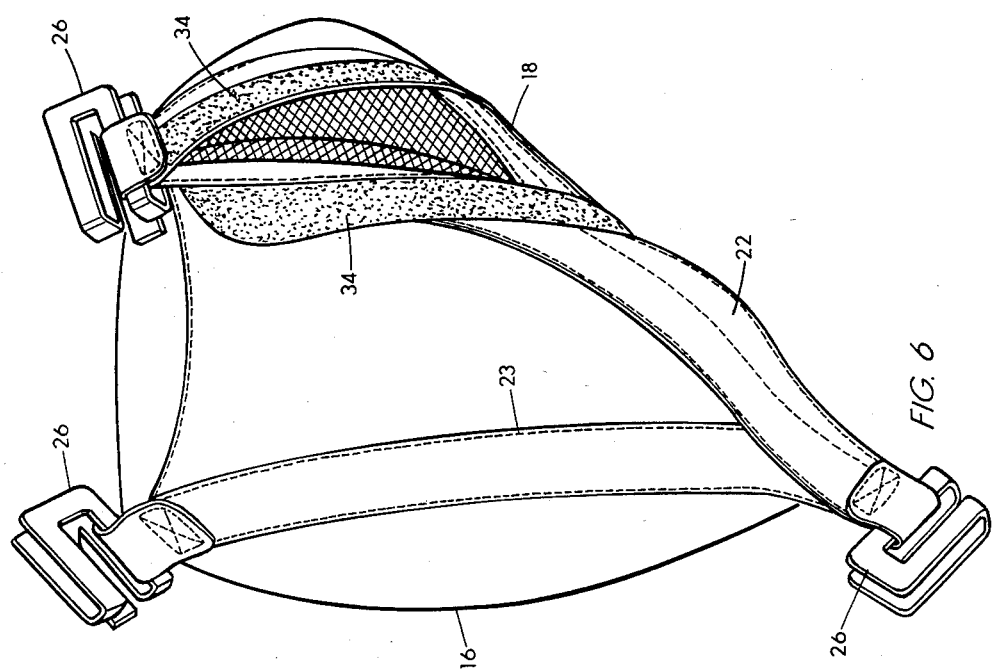
FIG. 6 is a rear view of the triangularly, configured restraint device having three connectors for use with a standard lap belt having a shoulder harness.

In another embodiment, as better shown in FIG. 6, a second support belting member 23 is fixedly attached to the back portion of panel 16 and communicates at one end with a lower connector 26 disposed at the terminus of belting member 22 and at the other with connector 26 (not shown in FIG. 1). Thus, in this embodiment, the device is secured by three connectors.

In operation, as shown in FIG. 1, the connectors 26 receive the upper portion of the shoulder harness 12 (for belts with shoulder harnesses) and the lower portion of the lap belt 12 as shown, as well as the opposing, reciprocal belt portion 12 that is buckled across the lap of the wearer in a standard configuration (not shown in FIG. 1). In this manner, the seat belt is engaged on the single side of the buckle in a "pull-across" lap belt with shoulder harness configuration standard in most modern vehicles. The restraint device is thus frictionally and securely attached at three separate locations by three connectors 26 as depicted in FIG. 1 in accordance with the configuration of the restraint device as shown in FIG. 6.

As better seen in FIG. 2, connector 26 is fixedly and permanently attached to the restraint by means of the horizontal woven belting member 22 having an extended portion terminating in a looped portion which engages upper strap engaging arms 28 and doubles back and is fixedly attached to itself by, for example, stitching at a fastening portion 24. In this manner, woven belting member 22 is immovably secured to the connector 26.

As better seen in FIGS. 3, 4 and 5, the connector 16 frictionally and securely attaches to a standard, webbed lap belt 12. This attachment, although secure and immovable, can be easily detached. In operation, the belt 12 is moved into position in between the upper and lower pairs of strap engaging arms 28 and 29. The side of the belt 12 is "snugged-up" against the upstanding portion 32. As shown in FIG. 3, the belt 12 is then looped up through the open "U-shaped" portion of the upper engaging arms 28 and then looped downwardly through the open "U-shaped" portion of lower engaging arms 29. The downward loop is then moved around tongue portion 30 as shown in FIG. 4 and finally pulled snug as shown in FIG. 5. In this manner, the belt 12 is frictionally engaged in connector 26 between lower engaging arms 29 and tongue portion 30 in a manner such that the belt cannot slip because it is restrained by upstanding portions 32 as well as the tongue portion 30 in cooperation with the lower pair of strap engaging arms 29 in a manner as shown in FIG. 5.

Connector 26 cooperates to frictionally engage belt 12 to releasibly fasten the restraint to the upper shoulder harness 12 and at two points on the lower lap belt 12. It will be realized by those skilled in the art that other types of disconnectors can, of course, be substituted for the connectors 26 without departing from the basic teaching and concept of the instant invention. However, there are certain advantages present in the detachable connector which render it ideally suited for use in this particular application, namely its capability of immovably engaging an unmodified vehicle restraining belt to fasten and secure the restraint yet being readily detachable.

It will be realized, in accordance with FIG. 1, that the present invention is fully compatible with the recommended "crash position" which is to be assumed by passengers of commercial airliners and the like in the event of an emergency. In this configuration, as the adult bends forward, the infant is merely laid down in the adult's lap in which position the child is shielded from both above and below by the adult's body. Yet the adult's body is not required to restrain the child; all of the restraint force being borne by the lap and/or shoulder belt. In all positions where the infant is held by the harness, he/she faces the adult which is a secure and natural position for a small child. The restraining position of FIG. 1 is essentially identical to that which the child assumes when being cradled in an adult's arms.

In accordance with one embodiment, as shown in FIG. 6, the restraint comprises a triangular, pouch panel 16 having a pair of woven belting members 22. A first belting traverses the lower back portion of the panel and a second belting member traverses one side of opening 18. The two belting members 22 and 23 converge and join at their termination where they, together, are fixedly attached to a connector 26 as previously described. Thus, the belting members 23 and 22 terminate at each end at a connector 26 to form a triangular type configuration shown in FIG. 6. In accordance with this aspect of the invention as is shown in FIG. 1, the restraint can be secured at three positions on a standard lap belt with a shoulder harness. In accordance with another embodiment as shown in FIG. 7, the restraint comprises a pouch having two webbed, substantially parallel, woven belting members 22 terminating at connectors 26. In this configuration, the restraint can be worn with a conventional lap belt which does not have a shoulder harness.

As is better seen in FIGS. 6 and 7, in a greatly preferred embodiment along the length of the opening 18 and interior thereto, in a juxtaposed relationship, is a a hook and loop fastening means such as VELCRO insert 34 that runs substantially the entire length of the restraint device opening 20 interior of belt 22. The VELCRO inserts 34 cooperate to restrict the opening 20 such that fastening and unfastening the inserts 34 allows security for the infant and yet allows access to the infant such as for changing diapers and the like. In this manner, the VELCRO insert 34 secures whatever portion of the infant the attending adult wishes. It will be realized that other fastening devices such as zippers, snaps and the like can be used without departing from the central aspect of the invention.

While the invention has been explained in relation to its preferred embodiment, it is to be understood the various modifications will become apparent to those skilled in the art upon reading the specification. The invention is intended to cover such modifications as fall within the scope of the appended claims.

What is claimed is:

1. A safety restraint device for use in combination with an unmodified seat belt to secure an infant in a face-to-face relationship with an attending adult occupying and using the seat belt which comprises:

(a) a pouch means having an opening adapted to receive an infant and being of a shape effective to support the head, backside and rump of said infant to secure said infant therein;

(b) at least two connector means attached to said pouch means approximately at each end of said opening for immovably securing said pouch assembly to said seat belt, said pouch supportedly secured by said connectors independent of the said attending adult.

2. The safety restraint device of claim 1 wherein said pouch means is fabricated and collapsible.

3. The safety restraint device of claim 2 wherein said pouch means is securably attached to a support belting which, in turn, is fixedly attached to said connector means.

4. The safety restraint device of claim 1 wherein said connector means detachably and frictionally engages said unmodified seat belt.

5. The restraint device of claim 4 wherein said connector comprises a first, flattened pair of seat belt engaging arms; a second, flattened pair of seat belt engaging arms disposed apart from but substantially parallel to said first pair of seat belt engaging arms; a substantially perpendicular connecting portion communicating with said first and second pair of seat belt engaging arms to maintain said first and second pair of seat belt engaging arms in a spaced apart position relative one another; and a tongue member substantially parallel to said second set of seat belt engaging arms, such that said first and second pair of seat belt engaging arms cooperate with said tongue member in conjunction with said connecting portion to frictionally engage said seat belt, thus immovably attaching said device to said seat belt.

6. The device of claim 1 wherein said connector means comprise three connectors positioned relative one to the other to engage said seat belt wherein said seat belt includes a standard shoulder harness.

7. The device of claim 1 wherein said opening contains a fastener means for selectively opening and closing said opening.

8. The device of claim 7 wherein said fastener means comprises a hook and loop fastening means fastener.

9. A safety restraint device for use in combination with an unmodified seat belt to secure an infant in a face-to-face relationship with an attending adult occupying and using the seat belt which comprises:

(a) a pouch means for securing an infant therein and being of a shape effective to support the head, backside and rump of said infant;

(b) at least two connector means attached to said pouch means for immovably securing said pouch assembly to said seat belt independent of the said attending adult, wherein at least one of said connector means detachably and frictionally engages said unmodified seat belt, and wherein said at least one connector means comprises a first, flattened pair of seat belt engaging arms; a second, flattened pair of seat belt engaging arms disposed apart from but substantially parallel to said first pair of seat belt engaging arms; a substantially perpendicular connecting portion communicating with said first and second pair of seat belt engaging arms to maintain said first and second pair of seat belt engaging arms in a spaced apart position relative one another; and a tongue member substantially parallel to said second set of seat belt engaging arms, such that said first and second pair of seat belt engaging arms cooperate with said tongue member in conjunction with said connecting portion to frictionally engage said seat belt, thus immovably attaching said device to said seat belt.

10. The device of claim 9 wherein said connector means comprise three connectors positioned relative one to the other to engage said seat belt wherein said seat belt includes a standard shoulder harness.

11. The device of claim 9 wherein said pouch means has a horizontal opening containing, on the inside, upper position thereof, a fastener means for selectively opening and closing said opening.

12. The device of claim 11 wherein said fastener means comprises a hook and loop fastening means fastener.

* * * * *